(12) United States Patent
Akatsuka et al.

(10) Patent No.: US 10,536,059 B2
(45) Date of Patent: Jan. 14, 2020

(54) APPARATUS FOR MANUFACTURING IRON CORE FOR ROTATING ELECTRIC MACHINE

(71) Applicant: TOSHIBA INDUSTRIAL PRODUCTS & SYSTEMS CORPORATION, Kawasaki-Shi, Kanagawa (JP)

(72) Inventors: Takayuki Akatsuka, Mie (JP); Toyonobu Yamada, Mie (JP); Naoya Fujita, Mie (JP); Masanori Ihori, Mie (JP)

(73) Assignee: TOSHIBA INDUSTRIAL PRODUCTS & SYSTEMS CORPORATION, Kanagawa (JP)

(*) Notice: Subject to any disclaimer, the term of this patent is extended or adjusted under 35 U.S.C. 154(b) by 800 days.

(21) Appl. No.: 15/184,199

(22) Filed: Jun. 16, 2016

(65) Prior Publication Data

US 2016/0294260 A1 Oct. 6, 2016

Related U.S. Application Data

(63) Continuation of application No. PCT/JP2014/081397, filed on Nov. 27, 2014.

(30) Foreign Application Priority Data

Dec. 16, 2013 (JP) ................................. 2013-259087

(51) Int. Cl.
*H02K 15/02* (2006.01)

(52) U.S. Cl.
CPC ........ *H02K 15/02* (2013.01); *Y10T 29/53143* (2015.01)

(58) Field of Classification Search
CPC ...... H02K 15/02; H02K 15/024; H02K 15/00; Y10T 29/53143; Y10T 29/5313; Y10T 29/5317

(Continued)

(56) References Cited

U.S. PATENT DOCUMENTS

| | | | |
|---|---|---|---|
| 7,337,531 B2* | 3/2008 | Neuenschwander | .. B21D 28/22 29/609 |
| 2012/0241095 A1 | 9/2012 | Hirata | |

FOREIGN PATENT DOCUMENTS

| | | |
|---|---|---|
| CN | 102057556 | 5/2011 |
| JP | 57-156656 | 9/1982 |

(Continued)

OTHER PUBLICATIONS

Chinese Office Action (with English Translation) issued in CN 201480067781.4 dated Dec. 21, 2017.

(Continued)

*Primary Examiner* — Peter Dungba Vo
*Assistant Examiner* — Azm A Parvez
(74) *Attorney, Agent, or Firm* — DLA Piper LLP US

(57) ABSTRACT

The apparatus for manufacturing an iron core for a dynamo-electric machine according to an embodiment of the present invention is provided with a rotary layering part for layering while rotating an iron core material punched from an electromagnetic steel sheet, a drive source for generating a drive force for rotating the rotary layering part, and a drive force transmission part for transmitting the drive force generated by the drive source to the rotary layering part. The drive force transmission part is configured from a plurality of gears arranged between the drive source and the rotary layering part. The rotary layering part is provided with a rotation position establishing means for establishing the rotation position of the rotary layering part.

3 Claims, 4 Drawing Sheets

(58) Field of Classification Search
USPC .................................................. 29/732, 700
See application file for complete search history.

(56) References Cited

FOREIGN PATENT DOCUMENTS

| JP | S59-225832 | 12/1984 |
| JP | S61-009129 | 1/1986 |
| JP | 2000-094055 | 4/2000 |
| JP | 2004-174595 | 6/2004 |
| JP | 2004174595 A * | 6/2004 |
| JP | 2011-156585 | 8/2011 |
| JP | 2012-200750 | 10/2012 |
| JP | 2013-043195 | 3/2013 |
| JP | 2013-116497 | 6/2013 |

OTHER PUBLICATIONS

English language Abstract and Translation of CN 102057556 published on May 11, 2011.

Chinese Office Action (with English Language Translation) issued in CN 201480067781.4 dated Jul. 5, 2017.
International Search Report issued in PCT/JP2014/081397 dated Jan. 13, 2015.
English language Abstract and machine Translation of JP 2004-174595 published on Jun. 24, 2004.
English language Abstract and machine Translation of JP S59-225832 published on Dec. 18, 1984.
English language Abstract and machine Translation of JP 2011-156585 published on Aug. 18, 2011.
English language Abstract and machine Translation of JP 2012-200750 published on Oct. 22, 2012.
English language Abstract and machine Translation of JP 2013-116497 published on Jun. 13, 2013.
English language Abstract and machine Translation of JP 2013-043195 published on Mar. 4, 2013.
English language Abstract of JP S57-156656 published on Sep. 28, 1982.
English language Abstract of JP 2000-094055 published on Apr. 4, 2000.
Japanese Office Action issued in JP 2013-259087 dated Sep. 5, 2017.

* cited by examiner

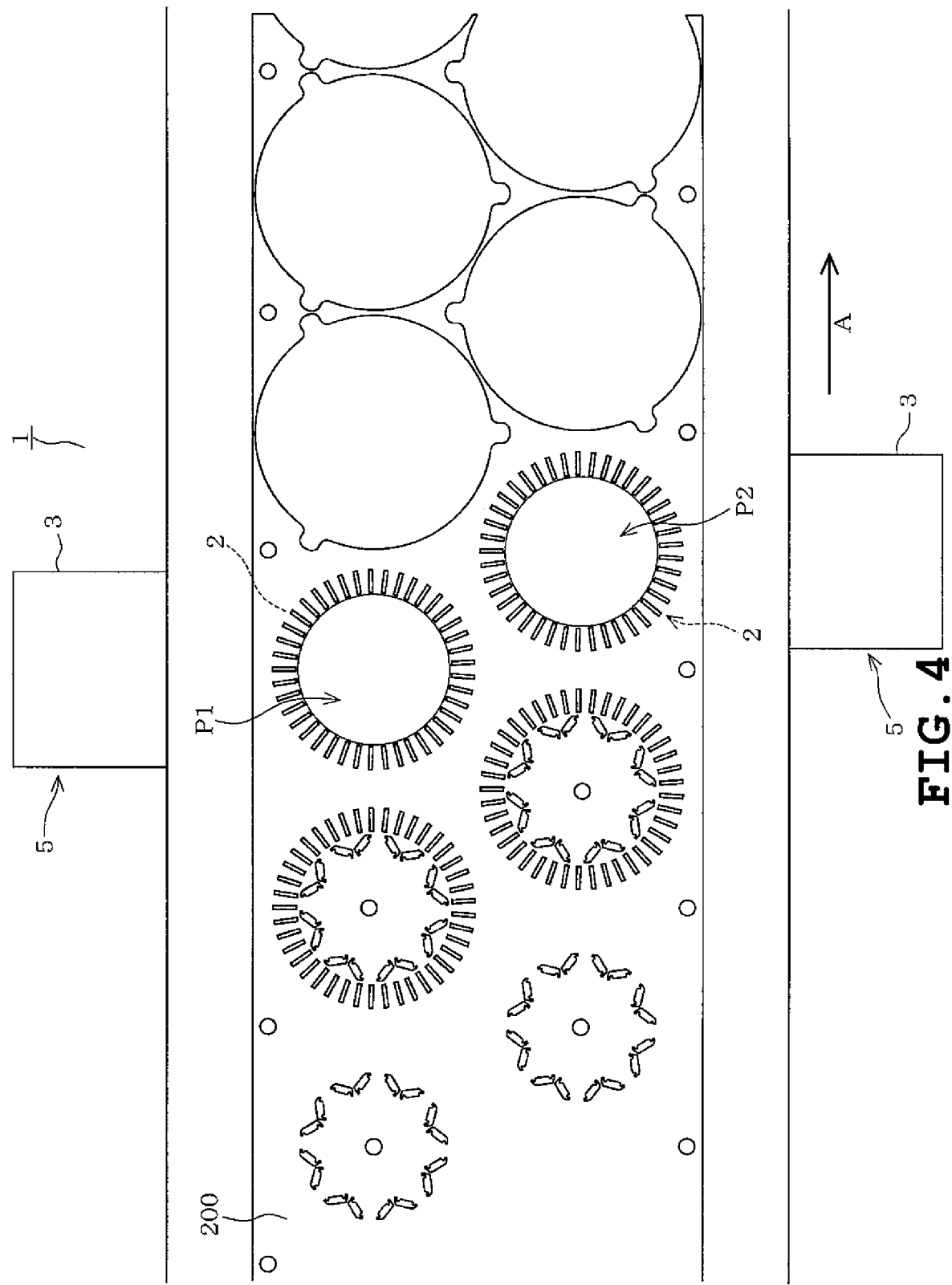

US 10,536,059 B2

APPARATUS FOR MANUFACTURING IRON CORE FOR ROTATING ELECTRIC MACHINE

CROSS REFERENCE TO RELATED APPLICATIONS

This application is a Continuation of International Application No. PCT/JP2014/081397 filed Nov. 27, 2014, which claims priority from Japanese Patent Application No. 2013-259087 filed Dec. 16, 2013. The entirety of all of the above-listed Applications are incorporated herein by reference.

TECHNICAL FIELD

An embodiment of the present invention relates to an apparatus for manufacturing an iron core for a rotating electric machine.

BACKGROUND ART

Iron cores for rotating electric machines are manufactured by laminating a plurality of sheets of iron core materials stamped from an electrical steel sheet, for example. In this case, deviations arise in the sheet thickness of the iron core materials to be laminated. To accommodate the deviations or skew the iron cores, the iron core materials are stacked by rotary lamination, that is, the stamped iron core materials are laminated while being rotated appropriately.

For example, Patent Literature 1 discloses an apparatus for manufacturing a laminated iron core, including a blanking die for laminating iron core materials stamped from an electrical steel sheet while rotating the materials, a servomotor for generating driving force to rotate the blanking die, and an endless cog belt for transferring the driving force generated by the servomotor to the blanking die. That is, according to the apparatus, the driving force generated by the servomotor is transferred through the belt to the blanking die, and thus the iron core materials are laminated while being rotated appropriately.

CITATION LIST

Patent Literature

Patent Literature 1
    Japanese Patent Laid-Open No. 2000-94055

SUMMARY OF INVENTION

Technical Problem

In a conventional configuration, however, the driving force of the servomotor is not transferred to the blanking die efficiently or promptly in some cases due to the effect of the strength of tension applied to the belt, or elongation and deterioration of the belt. Thus, such a conventional apparatus undesirably takes a lot of time to establish a rotary position, namely, to determine the rotary position of the blanking die. Therefore, it is impossible with the conventional configurations to sufficiently respond to higher speeds of the stamping process of stamping the iron core materials from the electrical steel sheet or larger sizes of the iron core to be manufactured, for example.

To address this, an embodiment of the present invention provides an apparatus for manufacturing an iron core for a rotating electric machine that shortens the time for establishing a rotary position of a rotary lamination section that laminates iron core materials while rotating the materials.

Solution to Problem

An apparatus for manufacturing an iron core for a rotating electric machine according to the embodiment of the present invention includes a rotary lamination section configured to laminate iron core materials stamped from an electrical steel sheet while rotating the iron core materials, a drive source configured to generate driving force to rotate the rotary lamination section, and a driving force transfer section configured to transfer the driving force generated by the drive source to the rotary lamination section. The driving force transfer section is formed by a plurality of gears arranged between the drive source and the rotary lamination section. In addition, the rotary lamination section includes a rotary position establishment device configured to establish a rotary position of the rotary lamination section.

BRIEF DESCRIPTION OF DRAWINGS

FIG. 4 is a plan view of the apparatus for manufacturing an iron core for a rotating electric machine.

DESCRIPTION OF EMBODIMENT

Figure 1:
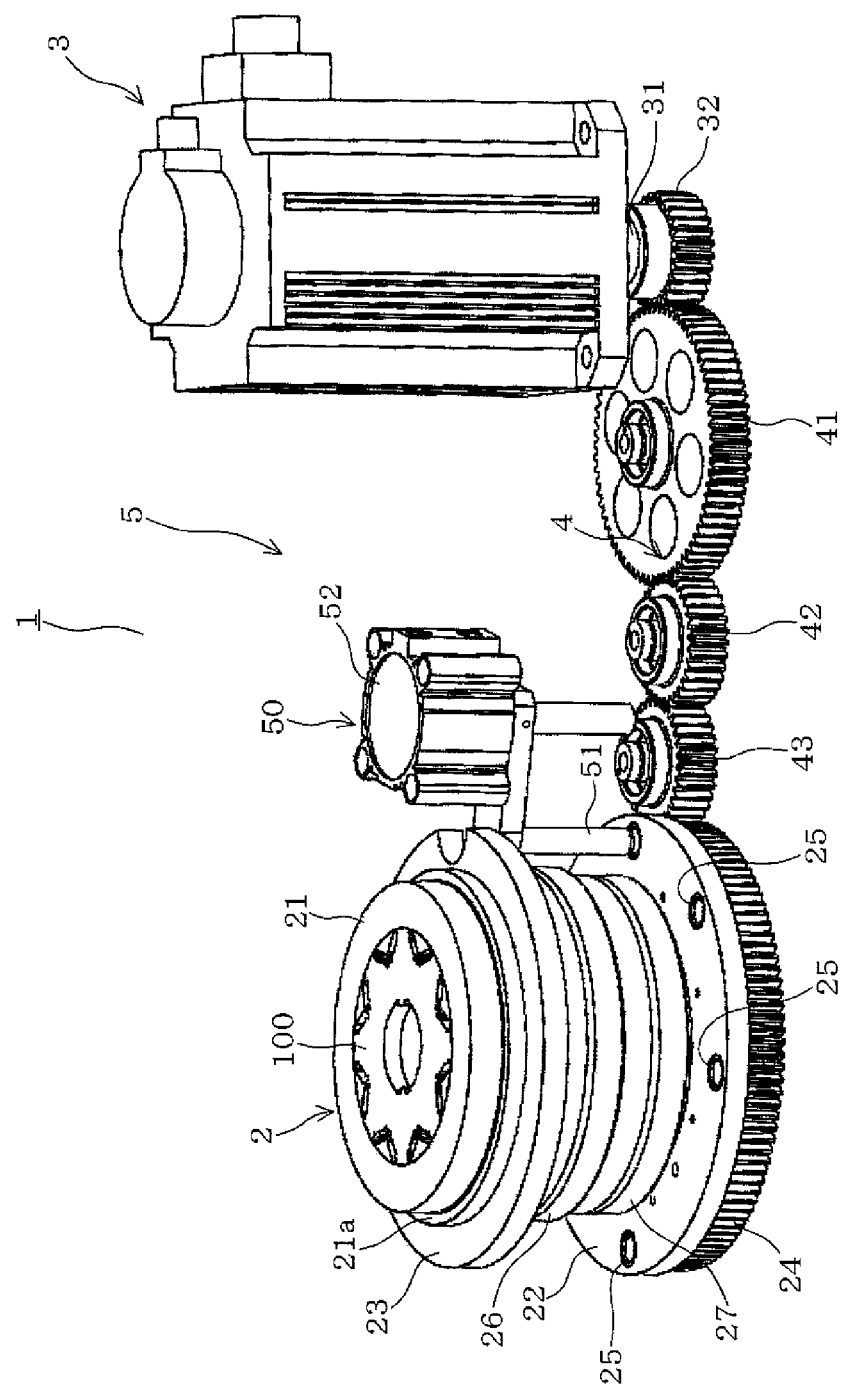
FIG. 1 is a schematic perspective view of an apparatus for manufacturing an iron core for a rotating electric machine according to an embodiment of the present invention illustrating the configuration of a relevant portion.

Hereinafter, an embodiment of an apparatus for manufacturing an iron core for a rotating electric machine will be described with reference to the drawings. As shown in FIG. 1, for example, an apparatus 1 for manufacturing an iron core for a rotating electric machine according to the embodiment includes die rings 2, servomotors 3, driving force transfer sections 4, and other components. Hereinafter, the apparatus 1 for manufacturing an iron core for a rotating electric machine will be simply referred to as a "manufacturing apparatus 1". In this case, one die ring 2, one servomotor 3, and one driving force transfer section 4 constitute a set of iron core material lamination unit 5.

Figure 2:
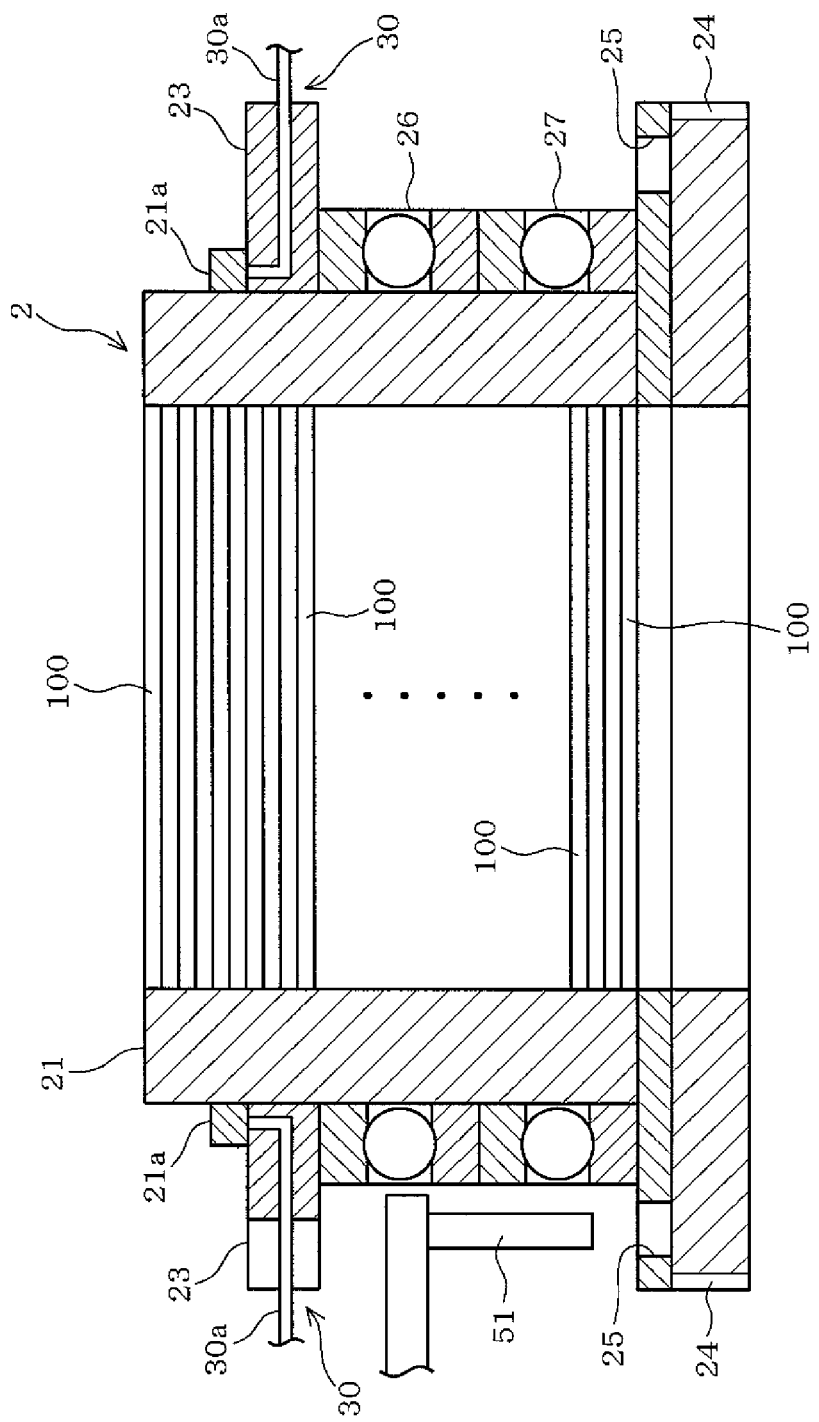
FIG. 2 is a schematic cross-sectional side view of a die ring and a peripheral portion of the die ring.
Figure 3:
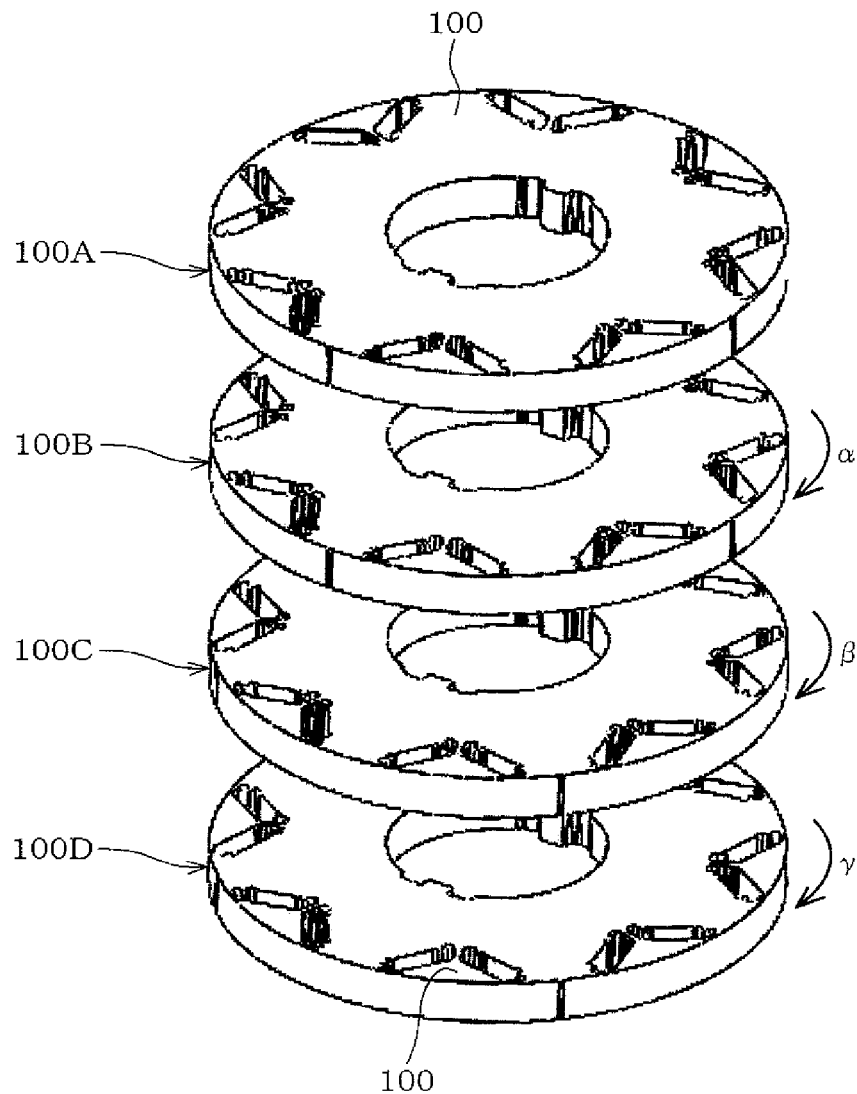
FIG. 3 is a schematic perspective view of stamped iron core materials being laminated while being rotated appropriately.

The die ring 2 is an example of the rotary lamination section and includes a rotating portion 21, a base portion 22, and a support portion 23. As illustrated in FIG. 2, for example, the rotating portion 21 has a generally cylindrical shape with a through-hole in an axial direction. A plurality of iron core materials 100 stamped from an electrical steel sheet are sequentially laminated from above into the rotating portion 21 and sequentially move downward within the rotating portion 21. The rotating portion 21 has on an upper part of its outer circumferential surface a ring-shaped supported portion 21a that extends in a circumferential direction of the rotating portion 21.

The base portion 22 has a generally disk shape and is attached to a lower end portion of the rotating portion 21. The base portion 22 and the rotating portion 21 rotate together as a unit. The base portion 22 has a larger diameter than that of the rotating portion 21 and has a gear portion 24 on its entire outer circumferential surface. The base portion 22 also has on an outer edge portion of its top surface a plurality of hole portions 25 into which a pin 51 to be described later in detail can be inserted. In this case, the hole portions 25 are spaced equidistantly from each other in a circumferential direction of the base portion 22. The base portion 22 opens in a circle at its central portion, similarly to the rotating portion 21. As the base portion 22 rotates, the rotating portion 21 is rotated together with the base portion 22. A plurality of, two in this case, bearings 26 and 27 are provided between the base portion 22 and the support portion 23. The provision of the bearings allows the rotating portion 21 to rotate smoothly while being supported by the support portion 23. The number of the bearings may be changed appropriately. For example, the die ring 2 may have one bearing or a plurality of two or more bearings.

The support portion 23 supports the supported portion 21a of the rotating portion 21 from below, thereby rotatably supporting the rotating portion 21. The support portion 23 is provided with a levitation function section 30, which is an example of a levitating device. In this case, the levitation function section 30 includes, for example, air flow paths 30a and an air supply source (not shown). The air flow paths 30a are guided to locations each opposed to a lower surface of the supported portion 21a of the rotating portion 21. The levitation function section 30 jets air supplied from the air supply source to the lower surface of the supported portion 21a through the air flow paths 30a. Thus, the levitation function section 30 levitates the rotating portion 21 by a small amount with a pressure of the air.

The small amount of levitation of the rotating portion 21 during the rotation prevents friction generated between the support portion 23 and the supported portion 21a of the rotating portion completely or almost completely. Accordingly, the rotating portion 21 is rotated smoothly. The amount of the levitation of the rotating portion 21 by the levitation function section 30 can be adjusted appropriately by appropriately changing the pressure of the air supplied from the air supply source. The levitation function section 30 may be driven, in other words, the levitation operation of the rotating portion 21 may be performed, for example, based on a control command from a controller (not shown) that controls the overall operation of the manufacturing apparatus 1. That is, the controller triggers the levitation function section 30 when the rotating portion 21 is rotated.

The die ring 2 also includes a rotary position establishment function section 50 for establishing the rotary position of the rotating portion 21 of the die ring 2 at a predetermined rotary position. The rotary position establishment function section 50 is an example of a rotary position establishment device and includes the pin 51 and an actuator 52. The pin 51 is provided to be vertically movable and the actuator 52 moves the pin 51 vertically. In this case, the actuator 52 is formed by a known air cylinder, for example, and moves the pin 51 downward in accordance with the supply of air from an air supply source (not shown). In this way, the pin 51 is inserted into any one of the hole portions 25 of the base portion 22 from above. This establishes the rotary position of the base portion 22 after rotation, that is, the rotary position of the rotating portion 21, at a predetermined rotary position.

The term "establishment" as used herein means to appropriately fix the rotary position of the rotating portion 21 after rotation at the rotary position set in advance for laminating the iron core materials 100 while appropriately rotating the iron core materials 100, in short, to appropriately determine the rotary position of the rotating portion 21 at the rotary position set in advance. The actuator 52 may be driven, in other words, the pin 51 may be driven, for example, based on a control command from a controller (not shown). That is, the controller triggers the actuator 52 every time the rotation operation of the rotating portion 21 is completed. The air supply source for supplying air to the actuator 52 may be separate from or the same as the air supply source for supplying air to the levitation function section 30 described above.

The servomotor 3 is an example of a drive source and is arranged to have its rotating shaft 31 oriented downward. The rotating shaft 31 is integrally provided with a drive gear 32 at a leading end portion, a lower end portion in this case, of the rotating shaft 31. Accordingly, as the rotating shaft 31 rotates, the drive gear 32 is rotated together with the rotating shaft 31.

The driving force transfer section 4 is formed by a plurality of gears arranged between the drive gear 32 of the servomotor 3 and the gear portion 24 of the die ring 2. In this case, the driving force transfer section 4 includes three connecting gears 41, 42, and 43. The first connecting gear 41 provided closest to the servomotor 3 has a larger diameter than those of the second connecting gear 42 and the third connecting gear 43 that are provided closer to the die ring 2 than the first connecting gear 41. The second connecting gear 42 has completely the same or almost the same diameter size as that of the third connecting gear 43. The reduction gear ratio by the driving force transfer section 4 according to the embodiment is set to 0.40.

The reduction gear ratio represents the amount of rotation of the rotating portion 21 of the die ring 2 relative to the amount of rotation of the drive gear 32 of the servomotor 3. For example, when the reduction gear ratio is 0.40, one rotation of the drive gear 32 of the servomotor 3 rotates the rotating portion 21 of the die ring 2 by 0.40 cycles. Diameter sizes of the connecting gears 41, 42, and 43 may be appropriately changed. For example, the first connecting gear 41, which is closest to the servomotor 3, and the third connecting gear 43, which is closest to the die ring 2 may be set at the same size while setting the diameter of the second connecting gear 42 interposed between the first and third connecting gears 41 and 43 larger or smaller than those of the connecting gears 41 and 43.

Alternatively, for example, all the connecting gears may have the same diameter size or different diameter sizes. The combination of the magnitude relationships of the connecting gears 41, 42, and 43 may be changed as appropriate. The number of the connecting gears provided in the driving force transfer section 4 is not limited to three. For example, the driving force transfer section 4 may include a plurality of four or more connecting gears, two connecting gears, or one connecting gear. The reduction gear ratio by the driving force transfer section 4 may be changed and set appropriately, and preferably the number, diameter sizes, and arrangement of the connecting gears are set to achieve the reduction gear ratio of 0.25 or more.

According to the above manufacturing apparatus 1, the driving force generated by the servomotor 3 is transferred through the plurality of connecting gears 41, 42, and 43 of the driving force transfer section 4 to the gear portion 24 of the die ring 2 and appropriately rotates the rotating portion 21. As a result, the iron core materials 100 in the rotating portion 21 are laminated sequentially while being rotated appropriately by rotation angles of α, β, γ . . . . In this way, iron cores are manufactured while appropriately accommodating the deviations of sheet thicknesses of the iron core materials 100 or skewing the iron core materials 100.

Inside the rotating portion 21, the sequential lamination of the iron core materials 100 forms iron core material blocks 100A, 100B, and 100C, . . . and further lamination of these iron core material blocks 100A, 100B, and 100C, . . . provides an iron core. The iron core materials 100 are laminated sequentially while each of these iron core material blocks 100A, 100B, and 100C, . . . is rotated appropriately. The rotation angle of the iron core material 100, or the iron core material blocks 100A, 100B, and 100C, . . . , in the rotating portion 21 may be changed appropriately. For example, all the angles α, β, γ . . . may be the same or different from each other. While the embodiment is described on the assumption that the iron core to be manufactured will be used in a rotor forming a rotating electric machine of what is called, inner rotor type, such an iron core is merely an example. An axial direction of an iron core to be manufactured, a laminating direction of iron core materials forming the iron core, and a sheet thickness direction of the iron core materials coincide with each other.

As shown in FIG. 4, for example, in the above manufacturing apparatus 1, areas P1 and P2 of the electrical steel sheet 200 from which the iron core materials 100 are stamped are arranged in a plurality of lines, two lines in this case, in the width direction of the electrical steel sheet 200. Here, the "width direction" of the electrical steel sheet 200 means a longitudinal direction of the electrical steel sheet 200, in other words, a direction orthogonal to a feed direction A of the electrical steel sheet 200 indicated by an arrow A in FIG. 4. The areas P1 and P2 from which the iron core materials 100 are stamped in each line are not completely aligned in the width direction of the electrical steel sheet 200, and are positioned to be slightly shifted in the longitudinal direction of the electrical steel sheet 200, that is, in the direction along the feed direction A.

The iron core material lamination units 5 described above are provided on both widthwise sides of the electrical steel sheet 200 at the positions corresponding in each line to the areas P1 and P2 from which the iron core materials 100 are stamped. The iron core material lamination units 5 stamp iron core materials from a plurality of lines, two lines in this case, of the electrical steel sheet 200 formed in the width direction of the electrical steel sheet 200. In the manufacturing apparatus 1, the die rings 2 are positioned under the respective areas P1 and P2 from which the iron core materials 100 are stamped, and the servomotors 3 are positioned on the side of the respective areas P1 and P2 from which the iron core materials 100 are stamped. The plurality of connecting gears 41, 42, and 43 of each driving force transfer sections 4 are arranged to connect the corresponding die rings 2 to the corresponding servomotors 3.

In this way, the die ring 2 and the servomotor 3 that constitute the iron core material lamination unit 5 become separate from each other in the width direction of the electrical steel sheet 200 especially when the manufacturing apparatus 1 are configured to stamp the iron core materials in plural lines in the width direction of the electrical steel sheet 200. The separation of the die ring 2 from the servomotor 3 tends to increase the distance between the die ring 2 and the servomotor 3. Accordingly, this configuration requires particular effort to efficiently transfer the driving force generated by the servomotor 3 to the die ring 2.

According to the manufacturing apparatus 1 in accordance with the embodiment, the driving force transfer section 4 that transfers the driving force generated by the servomotor 3 to the die ring 2 employs the configuration in which the driving force is transferred through the plurality of connecting gears 41, 42, and 43 arranged between the servomotor 3 and the die ring 2 rather than the conventional configuration in which the driving force is transferred through a belt. Thus, the driving force generated by the servomotor 3 is transferred to the die ring 2 extremely efficiently and promptly, without any risk of such a belt being influenced by the strength of tension applied to the belt or elongation and deterioration of the belt. As a result, the manufacturing apparatus 1 shortens the time for establishing the rotary position of the die ring 2 and can sufficiently respond to higher speeds of the stamping process of stamping the iron core materials from the electrical steel sheet or larger sizes of the iron core to be manufactured.

By the way, when the driving force transfer section 4 is formed by the plurality of connecting gears 41, 42, and 43, the driving force will be transferred through engagement of these connecting gears 41, 42, and 43. Accordingly, the establishment of the rotary position of the die ring 2, more specifically, the rotating portion 21 could be inaccurate due to the effect of backlash caused between the connecting gears 41, 42, and 43, namely, clearance and play.

The manufacturing apparatus 1 in accordance with the embodiment further includes the rotary position establishment function section 50 that establishes the rotary position of the rotating portion 21 of the die ring 2. Accordingly, the rotary position of the rotating portion 21 after rotation is established compulsorily, and the rotary position of the rotating portion 21 can be determined extremely accurately without being influenced by backlash caused between the connecting gears 41, 42, and 43.

According to the manufacturing apparatus 1 in accordance with the embodiment, the rotary position establishment function section 50 establishes the rotary position of the die ring 2 by inserting the pin 51 into the hole portion 25 of the die ring 2 from above. Thus, there is no risk of an eccentric load in an axial direction of the die ring 2, that is, an eccentric load tilting the axial direction during the insertion of the pin 51, so that the die ring 2 will not be tilted. In the embodiment, the pin 51 is illustrated to be inserted into the hole portion 25 of the die ring 2 from above, while the pin 51 may be inserted into the hole portion 25 of the die ring 2 from below. That is, the direction in which the pin is inserted is preferably set to coincide with the axial direction of the die ring 2 as much as possible, and more preferably, almost or completely coincide with the axial direction of the die ring 2. If the pin is configured to be inserted into the die ring 2 from the side, the die ring 2 receives an eccentric load in the axial direction of the die ring 2 during the insertion of the pin, increasing risk of tilting of the die ring 2. Such a configuration in which the pin is inserted into the die ring 2 from the side, therefore, is not recommended.

The manufacturing apparatus 1 in accordance with the embodiment includes the levitation function section 30 that levitates the die ring 2. Thus, when the rotating portion 21 of the die ring 2 is rotated, the rotating portion 21 is levitated by a small amount to be rotated smoothly. That is, the levitation almost or completely prevents the influence of the friction generated during the rotation of the rotating portion 21, and the rotary position of the rotating portion 21 is determined extremely accurately.

The apparatus for manufacturing an iron core for a rotating electric machine according to the above described embodiment includes a rotary lamination section that laminates iron core materials stamped from an electrical steel sheet while rotating the iron core materials, a drive source that generates driving force to rotate the rotary lamination section, and a driving force transfer section that transfers the driving force generated by the drive source to the rotary lamination section. The driving force transfer section is formed by a plurality of gears arranged between the drive source and the rotary lamination section. In addition, the rotary lamination section includes a rotary position establishment device that establishes a rotary position of the rotary lamination section. According to the configuration, the manufacturing apparatus shortens the time for establishing the rotary position of the rotary lamination section that laminates the iron core materials while rotating the iron core materials and can sufficiently respond to higher speeds of the stamping process of stamping the iron core materials from the electrical steel sheet or larger sizes of the iron core to be manufactured.

It is to be noted that the embodiment is presented by way of example, and not intended to limit the scope of the invention. The novel embodiments described herein may be embodied in other various forms. Also, various omissions, substitutions, and changes may be made without departing from the spirit of the invention. The embodiment and its modification are included in the scope and spirit of the invention and are also included in the scope of the inventions as claimed and their equivalents.

REFERENCE SIGNS LIST

In the drawings, the following reference numerals indicate the corresponding components.
1 APPARATUS FOR MANUFACTURING IRON CORE FOR ROTATING ELECTRIC MACHINE
2 DIE RING (ROTARY LAMINATION SECTION)
3 SERVOMOTOR (DRIVE SOURCE)
4 DRIVING FORCE TRANSFER SECTION
5 IRON CORE MATERIAL LAMINATION UNIT
30 LEVITATION FUNCTION SECTION (LEVITATING DEVICE)
41, 42, 43 CONNECTING GEAR (GEAR)
50 ROTARY POSITION ESTABLISHMENT FUNCTION SECTION (ROTARY POSITION ESTABLISHMENT DEVICE)
51 PIN
100 IRON CORE MATERIAL
200 ELECTRICAL STEEL SHEET

The invention claimed is:

1. An apparatus for manufacturing an iron core for a rotating electric machine comprising:
a rotary lamination section formed by a cylindrical rotating portion and a base portion, the base portion having a larger diameter than a diameter of the rotating portion and including a gear portion on an outer circumferential surface thereof and an outer edge portion including a plurality of hole portions formed therein, the rotary lamination section being configured to laminate iron core materials stamped from an electrical steel sheet while rotating the iron core materials;
a drive source configured to generate driving force to rotate the rotary lamination section; and
a driving force transfer section configured to transfer the driving force generated by the drive source to the rotary lamination section through the gear portion,
wherein the driving force transfer section is formed by a plurality of gears arranged between the drive source and the rotary lamination section, and
the rotary lamination section includes a rotary position establishment device configured to establish a rotary position of the rotary lamination section, the rotary position establishment device including a pin configured to be inserted into any one of the plurality of hole portions from above or from below,
rotation angles of the iron core materials are set to respective different angles, and
the rotary position establishment device is configured to drive the pin every time the rotation operation of the rotary lamination section is completed.

2. The apparatus for manufacturing an iron core for a rotating electric machine according to claim 1, further comprising a levitating device configured to levitate the rotary lamination section.

3. The apparatus for manufacturing an iron core for a rotating electric machine according to claim 1, wherein
iron core material lamination units each constituted by the rotary lamination section, the drive source, and the driving force transfer section are placed on both widthwise sides of the electrical steel sheet, and
the iron core material lamination units are configured to stamp the iron core materials from a plurality of lines of the electrical steel sheet formed in the width direction of the electrical steel sheet.

* * * * *